United States Patent
Kobayashi

(10) Patent No.: US 10,043,244 B2
(45) Date of Patent: Aug. 7, 2018

(54) IMAGE PROCESSING DEVICE, IMAGE PROCESSING METHOD, IMAGE PROCESSING PROGRAM, AND RECORDING MEDIUM

(71) Applicant: Morpho, Inc., Chiyoda-ku, Tokyo (JP)

(72) Inventor: Michihiro Kobayashi, Tokyo (JP)

(73) Assignee: MORPHO, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 14/689,286

(22) Filed: Apr. 17, 2015

(65) Prior Publication Data

US 2015/0302558 A1    Oct. 22, 2015

(30) Foreign Application Priority Data

Apr. 17, 2014    (JP) .................................. 2014-085642

(51) Int. Cl.
*G06K 9/00* (2006.01)
*G06T 5/00* (2006.01)

(52) U.S. Cl.
CPC .... *G06T 5/002* (2013.01); *G06T 2207/10024* (2013.01); *G06T 2207/20012* (2013.01); *G06T 2207/20028* (2013.01)

(58) Field of Classification Search
None
See application file for complete search history.

(56) References Cited

U.S. PATENT DOCUMENTS

| | | | | |
|---|---|---|---|---|
| 3,971,065 A | * | 7/1976 | Bayer | ............... H01L 27/14621 313/371 |
| 6,525,723 B1 | * | 2/2003 | Deering | .................... G06T 5/20 345/419 |
| 7,508,550 B2 | * | 3/2009 | Kameyama | .............. H04N 1/60 358/1.9 |

(Continued)

FOREIGN PATENT DOCUMENTS

| | | |
|---|---|---|
| CN | 101079956 A | 11/2007 |
| CN | 101394485 A | 3/2009 |

(Continued)

OTHER PUBLICATIONS

Wikipedia, "YUV", published on Apr. 14, 2013.*

(Continued)

*Primary Examiner* — Feng Niu
(74) *Attorney, Agent, or Firm* — Sughrue Mion, PLLC

(57) ABSTRACT

The image processing device performs noise removal processing for an input image. The image processing device comprises a filter setting unit configured to set first and second filter factors by using a first target pixel value of a noise processing target pixel to be targeted to the processing and a reference pixel value of a plurality of reference pixels surrounding the noise processing target pixel and a noise removal unit configured to calculate a corrected pixel value by sequentially adding a luminance component of the reference pixel value weighted with the first filter factor and sequentially adding a chroma component of the reference pixel value weighted with the second filter factor, and remove noise of the noise processing target pixel by using the corrected pixel value. The input image has pixel values according to Bayer pattern format.

7 Claims, 7 Drawing Sheets

(56) References Cited

U.S. PATENT DOCUMENTS

| | | | | |
|---|---|---|---|---|
| 7,671,909 | B2* | 3/2010 | Uvarov | G06T 5/20 348/246 |
| 7,916,964 | B2* | 3/2011 | Fukuoka | G06T 3/403 382/243 |
| 7,964,835 | B2* | 6/2011 | Olsen | G02B 3/0062 250/208.1 |
| 8,098,959 | B2* | 1/2012 | Yeung | G06T 3/60 345/658 |
| 8,165,394 | B2* | 4/2012 | Cai | G06T 3/4015 382/166 |
| 8,223,226 | B2* | 7/2012 | Tsuruoka | H04N 5/217 348/222.1 |
| 8,269,862 | B2* | 9/2012 | Sasaki | H04N 5/217 348/241 |
| 8,304,709 | B2* | 11/2012 | Olsen | G02B 3/0062 250/208.1 |
| 8,363,937 | B2* | 1/2013 | Murata | H04N 5/3572 382/167 |
| 8,477,173 | B2* | 7/2013 | Kenoyer | H04N 7/142 348/14.08 |
| 8,526,758 | B2* | 9/2013 | Uemura | G06K 9/40 358/3.26 |
| 8,629,390 | B2* | 1/2014 | Olsen | G02B 3/0062 250/208.1 |
| 8,743,229 | B2* | 6/2014 | Kim | G06T 5/002 348/222.1 |
| 9,294,745 | B2* | 3/2016 | Olsen | G02B 3/0062 |
| 2003/0222991 | A1* | 12/2003 | Muammar | G06T 5/40 348/222.1 |
| 2005/0036160 | A1* | 2/2005 | Goto | G06T 5/40 358/1.9 |
| 2005/0280869 | A1* | 12/2005 | Kameyama | H04N 1/60 358/3.01 |
| 2006/0158509 | A1* | 7/2006 | Kenoyer | H04N 7/142 348/14.08 |
| 2006/0284862 | A1* | 12/2006 | Uvarov | G06T 5/20 345/204 |
| 2007/0285441 | A1* | 12/2007 | Fukuoka | G06T 3/403 345/660 |
| 2008/0298716 | A1* | 12/2008 | Yamagata | H04N 5/3675 382/275 |
| 2009/0304277 | A1* | 12/2009 | Murata | H04N 5/3572 382/167 |
| 2010/0067789 | A1* | 3/2010 | Cai | G06T 3/4015 382/166 |
| 2010/0104221 | A1* | 4/2010 | Yeung | G06T 3/60 382/297 |
| 2010/0188529 | A1* | 7/2010 | Tsuruoka | H04N 5/217 348/234 |
| 2010/0194933 | A1* | 8/2010 | Sasaki | H04N 9/045 348/241 |
| 2011/0158554 | A1* | 6/2011 | Uemura | G06K 9/40 382/275 |
| 2012/0008017 | A1* | 1/2012 | Jeong | H04N 5/3675 348/246 |
| 2012/0020541 | A1* | 1/2012 | Hayashida | A61B 6/583 382/132 |

FOREIGN PATENT DOCUMENTS

| | | |
|---|---|---|
| JP | 2001-251636 A | 9/2001 |
| JP | 2006-4124 A | 1/2006 |
| JP | 2006-60660 A | 3/2006 |
| JP | 2007110338 A | 4/2007 |
| JP | 2009-27619 A | 2/2009 |
| JP | 2010-10976 A | 1/2010 |
| JP | 2010154024 A | 7/2010 |
| JP | 2010157163 A | 7/2010 |
| JP | 2010-178302 A | 8/2010 |
| JP | 2011-113182 A | 6/2011 |
| JP | 2011-135323 A | 7/2011 |
| JP | 2011-147072 A | 7/2011 |
| JP | 2012-114735 A | 6/2012 |
| JP | 2013218393 A | 10/2013 |
| JP | 2013219621 A | 10/2013 |

OTHER PUBLICATIONS

Communication dated Feb. 18, 2016 from the Korean Intellectual Property Office in counterpart application No. 10-2015-0054515.
Communication dated May 24, 2016 from the Japanese Patent Office in counterpart application No. 2015-084919.
Communication dated May 16, 2016 from the Taiwanese Intellectual Property Office in counterpart application No. 104112524.
Communication dated Nov. 15, 2016 from the Japanese Patent Office in counterpart application No. 2015-084919.
Communication dated Oct. 25, 2017, from the State Intellectual Property Office of People's Republic of China in counterpart Application No. 201510184353.6.
Communication dated Feb. 20, 2018 from the Japanese Patent Office in counterpart application No. 2017-021916.
Hara et al., "Noise Reduction for Color CCD Image Sensors Based on ∈-neighborhood of Images", Ricoh Technical Report, No. 36, Dec. 2010, pp. 61-67. (11 pages total).

* cited by examiner

IMAGE PROCESSING DEVICE, IMAGE PROCESSING METHOD, IMAGE PROCESSING PROGRAM, AND RECORDING MEDIUM

BACKGROUND

Field of the Invention

One aspect of the present invention relates to an image processing device, an image processing method, an image processing program, and a recording medium.

Background Arts

As image processing devices, those which perform noise removal processing for input images have conventionally been known. The image processing device of Patent Literature 1 (Japanese Patent Application Laid-Open No. 2007-110338) treats a local component of a Bayer signal as a feature amount vector. Then, the image processing device calculates a weighting factor, which is based on surrounding vector differences, and a vector norm.

The image processing device of Patent Literature 2 (Patent Literature 2: Japanese Patent Application Laid-Open No. 2010-157163) performs noise removal processing for an input signal presented by a YUV signal.

SUMMARY OF THE INVENTION

Meanwhile, input images presented by YUV signals are images obtained after spatial interpolation processing. Therefore, the input signals presented by YUV signals have such high spatial correlations among pixels that noise components are hard to remove therefrom. Consequently, image processing devices, image processing methods, image processing programs, and recording media which exhibit excellent noise removal effects have been desired in this technical field.

The image processing device in accordance with one aspect of the present invention is an image processing device for performing noise removal processing for an input image, the device comprising a filter setting unit configured to set first and second filter factors by using a first target pixel value of a noise processing target pixel to be targeted for the noise removal processing and a plurality of reference pixel values of a plurality of reference pixels surrounding the noise processing target pixel; and a noise removal unit configured to calculate a corrected pixel value by sequentially adding a luminance component of the reference pixel value weighted with the first filter factor and sequentially adding a chroma component of the reference pixel value weighted with the second filter factor, and remove noise of the noise processing target pixel by using the corrected pixel value, the input image having pixel values according to Bayer pattern format.

This image processing device executes filter processing for an input image having pixel values according to Bayer pattern format. This filter processing separates the pixel value of the input image into a luminance component and a chroma component at first. The luminance component is weighted with the first filter factor and added, and the chroma component is weighted with the second filter factor and added. This input image has the pixel values according to Bayer pattern format. Therefore, different pixels have such a low spatial correlation therebetween that abnormal pixel values, which can happen due to generated noise or the like, do not affect their surrounding pixel values. Consequently, this image processing device can exhibit excellent noise removal effects.

In one embodiment, the image processing device may further comprise an input buffer configured to store an input pixel value constituting the input image according to Bayer pattern format. The filter setting unit may comprise a shrunken image generation unit for generating a shrunken image by using the pixel value stored in the input buffer, a shrunken image buffer configured to store a shrunken pixel value constituting the shrunken image, and a reference pixel selection unit for selecting the reference pixels from the shrunken image stored in the shrunken image buffer. When executing the filter processing, reference pixels existing in the surroundings of a pixel to be targeted to the filter processing are utilized for the processing. From the viewpoint of noise removal effects, it is desirable to select a number of reference pixels from a wide area. However, such selection of reference pixels may increase processing load. By contrast, this structure selects pixels constituting a shrunken image as the reference pixels. By selecting the reference pixels from the shrunken image, it is possible to obtain similar effects to those obtained when selecting a number of reference pixels from a wide area, while inhibiting the processing load from increasing.

In one embodiment, the filter setting unit may comprise a target pixel value generation unit for generating the first target image value by using the input pixel value stored in the input buffer, a difference calculation unit for calculating a pixel value difference by using the reference pixel value of the reference pixel selected by the reference pixel selection unit and the first target pixel value generated by the target pixel value generation unit, and a factor calculation unit for calculating the first and second filter factors by using the pixel value difference, a relationship between the pixel value difference and the first filter factor and a relationship between the pixel value difference and the second filter factor being changed dynamically according to the first target pixel value. The intensity of noise superposed on the input image depends on pixel values of a scene. This structure causes the filter factors to change dynamically according to pixel values of pixels to be targeted to noise processing. Therefore, the filter setting unit can favorably remove noise superposed on the input image.

In one embodiment, the reference pixel selection unit may select a part of shrunken pixels in the shrunken image stored in the shrunken image buffer as the reference pixel. This structure can further inhibit the processing load required for noise removal from increasing.

One embodiment may further comprise a posterior buffer configured to store the corrected pixel value according to Bayer pattern format and an abnormal pixel processing unit for processing an abnormal pixel in the image, the abnormal pixel processing unit comprising an abnormality determination unit for comparing, in a plurality of corrected pixel values stored in the posterior buffer, the second target pixel value of an abnormality processing target pixel with an estimated pixel value of the abnormality processing target pixel estimated from a surrounding pixel in the surroundings of the abnormality processing target pixel so as to determine whether or not the second target pixel value is abnormal and a substitution processing unit for substituting the second target pixel value with the estimated pixel value when the second target pixel value is determined to be abnormal by the abnormality determination unit. By substituting abnormal pixel values with the estimated pixel value, this structure can remove abnormal pixels from within the image to be filtered. Therefore, further excellent noise removal effects can be exhibited.

The image processing device in accordance with another aspect of the present invention is an image processing device for performing noise removal processing for an input image, the device comprising a posterior buffer configured to store a pixel value constituting an input image according to Bayer pattern format and an abnormality pixel processing unit for processing an abnormal pixel in the image, the abnormal pixel processing unit comprising an abnormality determination unit for comparing, in a plurality of corrected pixel values stored in the posterior buffer, a second target pixel value of an abnormality processing target pixel with an estimated pixel value of the abnormality processing target pixel estimated from a surrounding pixel in the surroundings of the abnormality processing target pixel so as to determine whether or not the second target pixel value is abnormal and a substitution processing unit for substituting the second target pixel value with the estimated pixel value when the second target pixel value is determined to be abnormal by the abnormality determination unit. By substituting abnormal pixel values with the estimated pixel value, this structure can remove abnormal pixels from within the image to be filtered. Therefore, further excellent noise removal effects can be exhibited.

The image processing method in accordance with another aspect of the present invention is an image processing method for performing noise removal processing for an input image by using a computer, the method comprising a filter setting step of setting first and second filter factors by using a first target pixel value of a noise processing target pixel to be targeted for the noise removal processing and a plurality of reference pixel values of a plurality of reference pixels surrounding the noise processing target pixel, and a noise removal step of calculating a corrected pixel value by sequentially adding a luminance component of the reference pixel value weighted with the first filter factor and sequentially adding a chroma component of the reference pixel value weighted with the second filter factor, and remove noise of the noise processing target pixel by using the corrected pixel value, the input image having pixel values according to Bayer pattern format.

The image processing program in accordance with still another aspect of the present invention is an image processing program for enabling a computer to function to perform noise removal processing for an input image by using the computer, the program causing the computer to function as a filter setting unit configured to set first and second filter factors by using a first target pixel value of a noise processing target pixel to be targeted for the noise removal processing and a plurality of reference pixel values of a plurality of reference pixels surrounding the noise processing target pixel, and a noise removal unit configured to calculate a corrected pixel value by sequentially adding a luminance component of the reference pixel value weighted with the first filter factor and sequentially adding a chroma component of the reference pixel value weighted with the second filter factor, and remove noise of the noise processing target pixel by using the corrected pixel value, the input image having pixel values according to Bayer pattern format.

The recording medium in accordance with yet another aspect of the present invention is a computer-readable recording medium recording an image processing program for enabling a computer to function to perform noise removal processing for an input image by using the computer, the program causing the computer to function as a filter setting unit configured to set first and second filter factors by using a first target pixel value of a noise processing target pixel to be targeted for the noise removal processing and a plurality of reference pixel values of a plurality of reference pixels surrounding the noise processing target pixel, and a noise removal unit configured to calculate a corrected pixel value by sequentially adding a luminance component of the reference pixel value weighted with the first filter factor and sequentially adding a chroma component of the reference pixel value weighted with the second filter factor, and remove noise of the noise processing target pixel by using the corrected pixel value, the input image having pixel values according to Bayer pattern format.

The above-mentioned image processing method, image processing program, and recording medium exhibit the same effects as those of the above-mentioned image processing device in accordance with one aspect of the present invention.

Various aspects and embodiments of the present invention provide an image processing device, an image processing method, an image processing program, and a recording medium which exhibit excellent noise removal effects.

DESCRIPTION OF EMBODIMENTS

Figure 1:
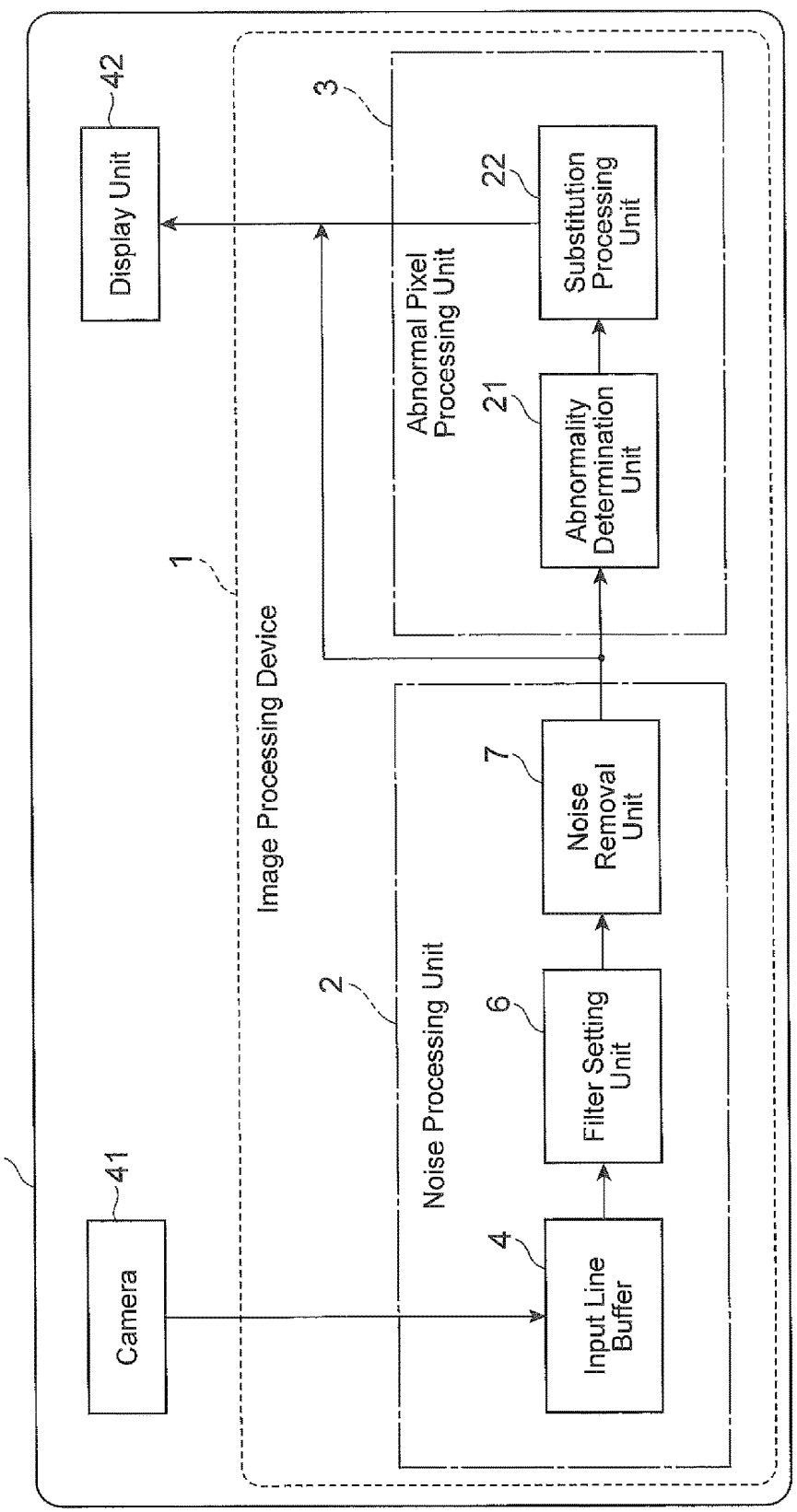
FIG. 1 is a functional block diagram of a portable terminal equipped with the image processing device in accordance with an embodiment.

In the following, embodiments of the present invention will be explained with reference to the accompanying drawings. In the drawings, the same or equivalent parts will be referred to with the same signs while omitting their redundant descriptions.

The image processing device in accordance with an embodiment outputs a frame image from which noise has been removed, for example. The image processing device is employed favorably when capturing a plurality of images consecutively or moving images, for example. The image processing device in accordance with this embodiment is favorably mounted in mobile terminals whose resources are limited, such as cellular phones, digital cameras, and PDAs (Personal Digital Assistants), for example. However, the image processing device may be mounted not only in these mobile terminals, but also in typical computers, for example. Other examples of the image processing device include the so-called on-chip ISPs (Image Signal Processors) built in imaging devices. By way of example, the image processing device mounted in a portable terminal will be explained in the following for easier understanding.

Figure 2:
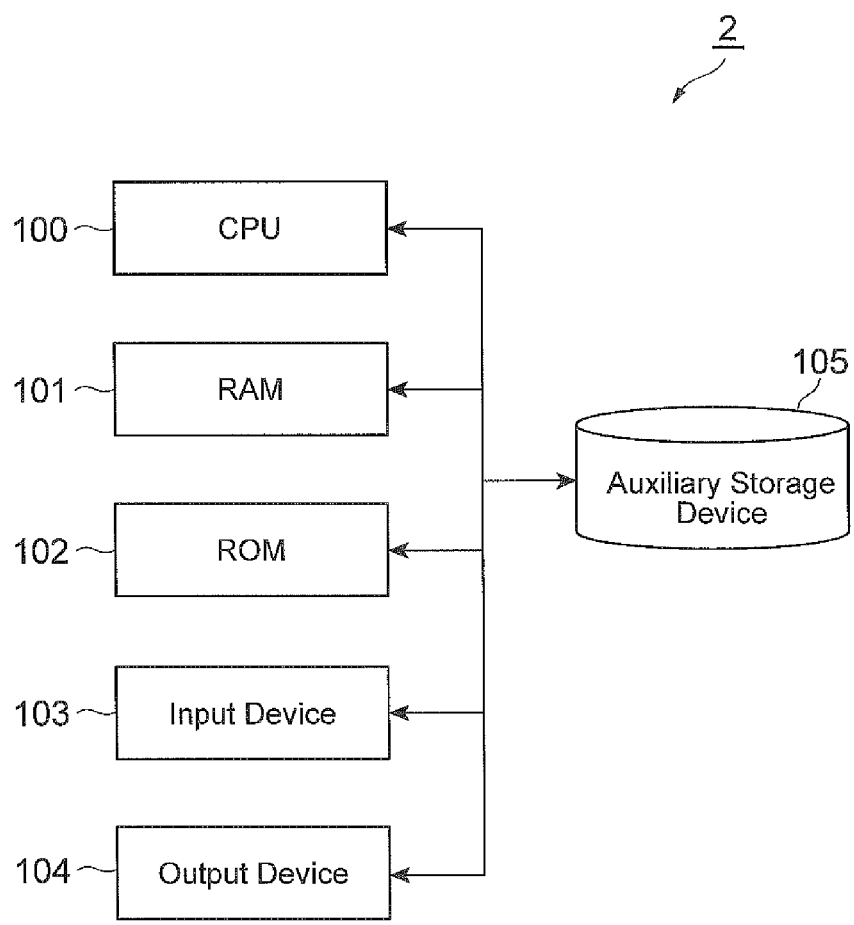
FIG. 2 is a hardware diagram of the portable terminal equipped with the image processing device in accordance with the embodiment.

A portable terminal T illustrated in FIG. 1 is a movable terminal carried by a user, for example. The portable terminal T has a hardware structure illustrated in FIG. 2. Physically, as illustrated in FIG. 2, the portable terminal T includes a CPU (Central Processing Unit) 100, main storage units such as a RAM (Random Access Memory) 101 and a ROM (Read Only Memory) 102, an input device 103 such as a camera or keyboard, an output device 104 such as a display, an auxiliary storage unit 105 such as a hard disk, and the like. Functions of the portable terminal T and image processing device 1 (it will be explained later) are achieved by causing hardware such as the CPU 100, RAM 101, and ROM 102 to read predetermined computer programs so as to operate the input device 103 and output device 104 and to read/write data from/to the main storage unit and auxiliary storage unit 105 under the control of the CPU 100. The portable terminal T may further comprise a communication module and the like. The image processing device 1 is explained as a hardware structure of the portable terminal T in the foregoing, but may be constructed as a typical computer system. The typical computer system includes the CPU 100, main storage units such as the RAM 101 and ROM 102, output device 104, auxiliary storage unit 105, and the like.

As illustrated in FIG. 1, the portable terminal T comprises a camera 41, an image processing device 1, and a display unit 42. The camera 41 captures a still image and/or moving images. The moving images include a plurality of frame images which are consecutive in a time series. The camera 41 may have a consecutive capture function to capture images repeatedly at predetermined intervals from a timing designated by a user operation and the like. The camera 41 outputs the frame images to the image processing device 1.

The image processing device 1 generates an output image by processing an input image obtained by the camera 41. For example, the image processing device 1 removes noise and abnormal pixels from the input image. An example of the noise is a flicker occurring on a captured image. Another example of the noise is a pixel value which is changed randomly between frame images as time passes. Or, the noise may be a pixel value which extremely differs from pixel values of surrounding pixels within the same frame. The pixel value is information associated with a pixel, and its examples include RGB components, a luminance component, a chroma (chrominance) value, and a saturation value. The abnormal pixel is meant to be a pixel having a pixel value including a difference not smaller than a predetermined threshold from a pixel value estimated from surrounding pixels.

The image processing device 1 comprises a noise processing unit 2 and an abnormal pixel processing unit 3, for example. The noise processing unit 2 removes noise from the frame image inputted from the camera 41. The noise processing unit 2 outputs a processed image after the noise processing. More specifically, the noise processing unit 2 performs noise removal processing for image data according to Bayer pattern format immediately after it is outputted from the camera 41. Then, the noise processing unit 2 outputs the image data according to Bayer pattern format from which the noise has been removed.

Figure 3:
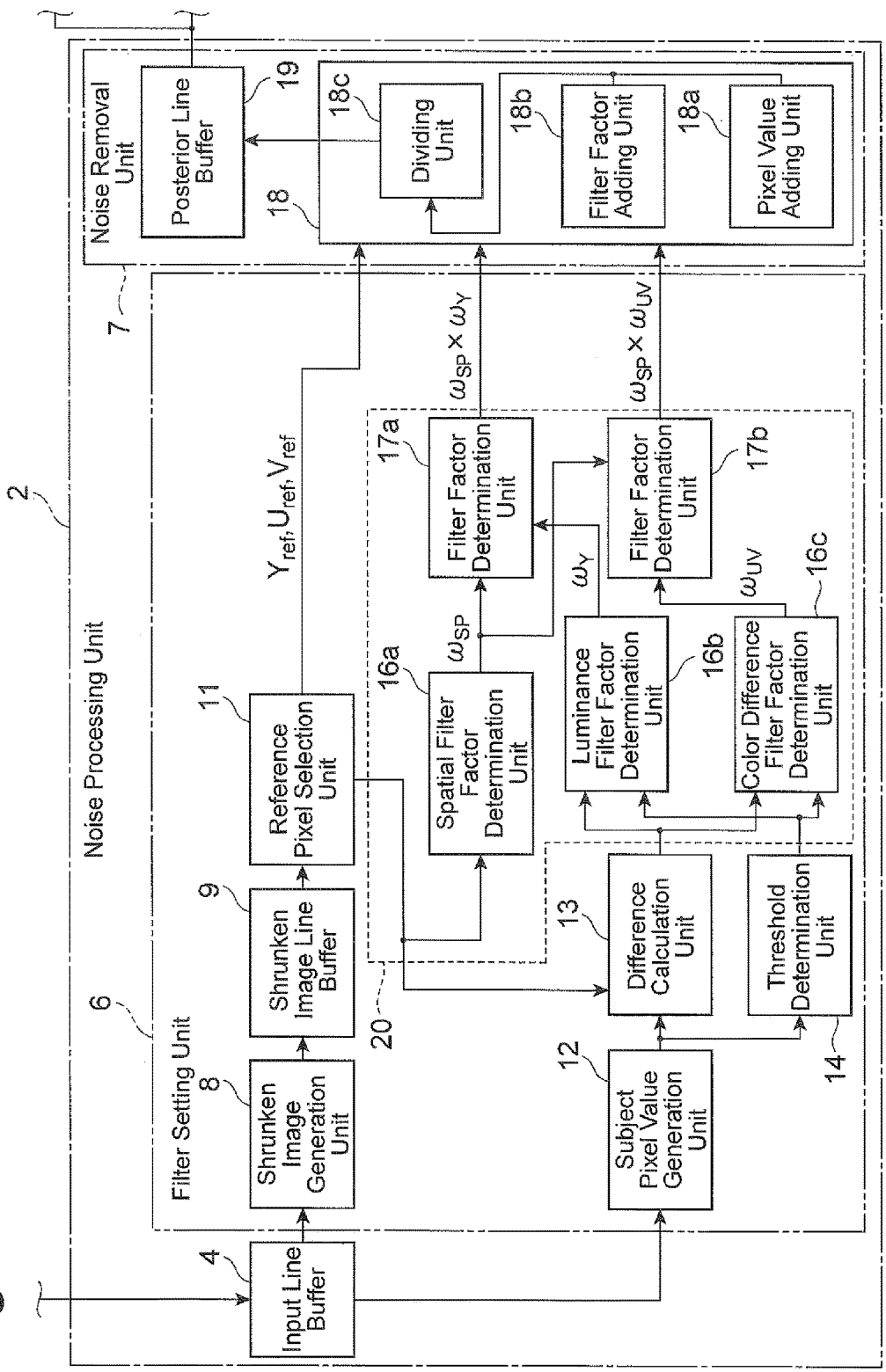
FIG. 3 is a functional block diagram of a noise processing unit provided in the image processing device in accordance with the embodiment.

As illustrated in FIG. 3, the noise processing unit 2 has an input line buffer (input buffer or input buffer unit) 4, a filter setting unit 6, and a noise removal unit 7. The noise processing unit 2 executes noise processing using the so-called bilateral filter. The bilateral filter processing removes noise while preserving the edges (edge-preserving smoothing). The bilateral filter processing adjusts a pixel to be targeted to noise processing by using the distance between the noise processing target pixel and another pixel existing in the surroundings of the noise processing target pixel and a pixel value of the noise processing target pixel.

Filter factors in the following explanation include a filter (first filter factor) applied to luminance and a filter (second filter factor) applied to chroma. The filter applied to luminance is determined according to a spatial filter factor and a luminance filter factor. The spatial filter factor is a factor calculated from a value concerning space. For example, the spatial filter factor is set so as to become larger or smaller as the distance between the noise processing target pixel or the surrounding pixel is shorter and longer, respectively. The luminance filter factor is set according to a luminance component of the noise processing target pixel and that of the surrounding pixel. The filter applied to chroma is determined according to a spatial filter factor and a chroma filter factor. The chroma filter factor is set according to the difference between a chroma component of the noise processing target pixel and that of the surrounding pixel.

The input line buffer 4 stores input pixel values of the input image outputted from the camera 41. The input image outputted from the camera 41 is in an image format of the so-called Bayer pattern. The camera 41 decomposes incoming light into three primary colors of red (R), green (G), and blue (B) by using a color filter and the like. The decomposed light components are detected by light-receiving elements arranged in a grid.

By using the pixel values stored in the input line buffer 4, the filter setting unit 6 sets a filter factor applied to luminance and a filter factor applied to chroma in order to remove noise from frame images. The filter setting unit 6 outputs the set filter factors to the noise removal unit 7.

The filter setting unit 6 has a shrunken image generation unit 8, a shrunken image line buffer (shrunken image buffer) 9, a reference image selection unit 11, a target pixel value generation unit 12, a difference calculation unit 13, a threshold determination unit 14, and a factor calculation unit 20.

The shrunken image generation unit 8 shrinks and fully colorizes the pixel values according to Bayer pattern format stored in the input line buffer 4. The shrunken pixel values of the shrunken image generated by the shrunken image generation unit 8 are utilized as reference pixel values in the noise processing.

The shrunken image line buffer 9 stores the pixel values of the shrunken pixels outputted from the shrunken image generation unit 8. One pixel in the shrunken image line buffer 9 corresponds to one block (e.g., an area of 4 pixels×4 pixels) in the input line buffer 4. The shrunken image line buffer 9 can set a desirable storage area. The shrunken image line buffer 9 is configured such that it can be referred by the reference pixel selection unit 11.

The reference pixel selection unit 11 selects one or a plurality of reference pixels from the pixels constituting the shrunken image stored in the shrunken image line buffer 9. The reference pixel selection unit 11 outputs positional information of the reference pixels in the shrunken image line buffer 9 to a spatial filter factor determination unit 16a. The reference pixel selection unit 11 outputs the pixel values of the reference pixels to the difference calculation unit 13 and noise removal unit 7.

The target pixel value generation unit 12 generates a pixel value at a noise processing target pixel. The noise processing target pixel is selected from the pixels stored in the input line buffer 4. Therefore, the noise processing target pixel has one pixel value of the R, G or B component. The other components are calculated by using pixel values of pixels in the surroundings of the noise processing target pixel. Therefore, the target pixel value has one color component of the selected pixel and the other two color components calculated from the pixel values of pixels in the surroundings of the noise processing target pixel. The target pixel value generation unit 12 executes noise processing for all the pixels in the input line buffer 4. The target pixel value generation unit 12 sequentially selects the pixels in the input line buffer 4 as the noise processing target pixel.

The difference calculation unit 13 calculates the difference between the pixel value of the noise processing target pixel and the pixel value of each reference pixel. The difference calculation unit 13 outputs the calculated difference to the factor calculation unit 20.

By using the pixel value of the noise processing target pixel, the threshold determination unit 14 determines a threshold for defining the luminance filter factor and the chroma filter factor. The threshold determination unit 14 outputs the determined threshold to the factor calculation unit 20.

The factor calculation unit 20 calculates a filter factor applied to luminance and a filter factor applied to chroma. The factor calculation unit 20 has the spatial factor determination unit 16a, a luminance filter factor determination unit 16b, a chroma filter factor determination unit 16c, a determination unit for the filter factor applied to luminance (first filter factor determination unit) 17a, and a determination unit for the filter factor applied to chroma (second filter factor determination unit) 17b.

By using the positional information of reference pixels in the shrunken image line buffer 9 outputted from the reference pixel selection unit 11, the spatial filter factor determination unit 16a determines the spatial filter factor. The spatial filter factor determination unit 16a stores spatial information of the reference pixels, more specifically, information in which the distance from a center pixel to each reference pixel is associated with the spatial filter factor. An example of this information is such a function that the spatial filter factor monotonously decreases with respect to the distance. The information may be a database in which spatial filter factors and distances are individually associated with each other. The distance from the center pixel to the reference pixel may satisfy any definition of the distance. The distance may be defined by Manhattan distance or Euclidean distance, for example. The spatial filter factor determination unit 16a outputs the determined spatial filter factor to the filter factor determination units 17a, 17b.

The luminance filter factor determination unit 16b determines the luminance filter factor by using the difference outputted from the difference calculation unit 13 and the threshold outputted from the threshold determination unit 14. The luminance filter factor determination unit 16b outputs the determined luminance filter factor to the filter factor determination unit 17a.

The chroma filter factor determination unit 16c determines the chroma filter factor by using the difference outputted from the difference calculation unit 13 and the threshold outputted from the threshold determination unit 14. The chroma filter factor determination unit 16c outputs the determined chroma filter factor to the filter factor determination unit 17b.

The filter factor determination unit 17a calculates the filter factor applied to luminance by using the spatial filter factor outputted from the spatial filter factor determination unit 16a and the luminance filter factor outputted from the luminance filter factor determination unit 16b. The filter factor determination unit 17a outputs to the noise removal unit 7, the filter factor applied to luminance.

The filter factor determination unit 17b calculates the filter factor applied to chroma by using the spatial filter factor outputted from the spatial filter factor determination unit 16a and the chroma filter factor outputted from the chroma filter factor determination unit 16c. The filter factor determination unit 17b outputs the noise removal unit 7 to the filter factor applied to chroma.

The noise removal unit 7 has a corrected pixel value calculation unit 18 and a posterior line buffer 19. The noise removal unit 7 calculates a corrected pixel value by using the pixel values of the reference pixels outputted from the reference pixel selection unit 11, the filter factor applied to luminance outputted from the filter factor determination unit 17a, and the filter factor applied to chroma outputted from the filter factor determination unit 17b.

The corrected pixel value calculation unit 18 has a pixel value adding unit 18a, a filter factor adding unit 18b, and a dividing unit 18c.

The pixel value adding unit 18a calculates a cumulative added value of luminance components. The cumulative added value of luminance components is a value obtained by sequentially adding the multiplied values of the luminance values outputted from the reference pixel selection unit 11, the spatial filter factor outputted from the factor calculation unit 20 and the filter factor applied to luminance. The pixel value adding unit 18a calculates a cumulative added value of chroma components. The cumulative added value of chroma components is a value obtained by sequentially adding the multiplied values of the chroma values outputted from the reference pixel selection unit 11, the spatial filter factor outputted from the factor calculation unit 20 and the filter factor applied to chroma.

The filter factor adding unit 18b calculates a cumulative added value (weighted added value) concerning the luminance filter factor and a cumulative added value (weighted added value) concerning the chroma filter factor by using the spatial filter factor outputted from the factor calculation unit 20, filter factor applied to luminance, and filter factor applied to chroma.

The dividing unit 18c calculates a luminance component of the corrected pixel value by dividing the cumulative added value of luminance components calculated by the corrected pixel value calculation unit 18 by the cumulative added value concerning the luminance filter factor. The dividing unit 18c calculates a chroma component of the corrected pixel value by dividing the cumulative added value of chroma components calculated by the corrected pixel value calculation unit 18 by the cumulative added value concerning the chroma filter factor.

The corrected pixel value is presented by the luminance component and chroma component. The luminance component of the corrected pixel value is calculated by dividing the cumulative added value of weighted luminance values by the cumulative added value of filter factors. The chroma component of the corrected pixel value is calculated by dividing the cumulative added value of weighted chroma values by the cumulative added value of filter factors. The dividing unit 18c outputs the calculated corrected pixel values to the posterior line buffer 19.

The posterior line buffer 19 stores the corrected pixel values according to Bayer pattern format. The posterior line buffer 19 has a data storage area equivalent to that of the input line buffer 4. Therefore, a pixel at a predetermined address in the posterior line buffer 19 corresponds to that at the same address in the input line buffer 4. In place of the pixel value in the input line buffer 4, the pixel value after the noise removal processing is stored in the posterior line buffer 19.

The image processing device 1 may output the pixel values stored in the posterior line buffer 19 directly to the display unit 42 without using the abnormal pixel processing unit 3 (it will be explained later).

Figure 4:
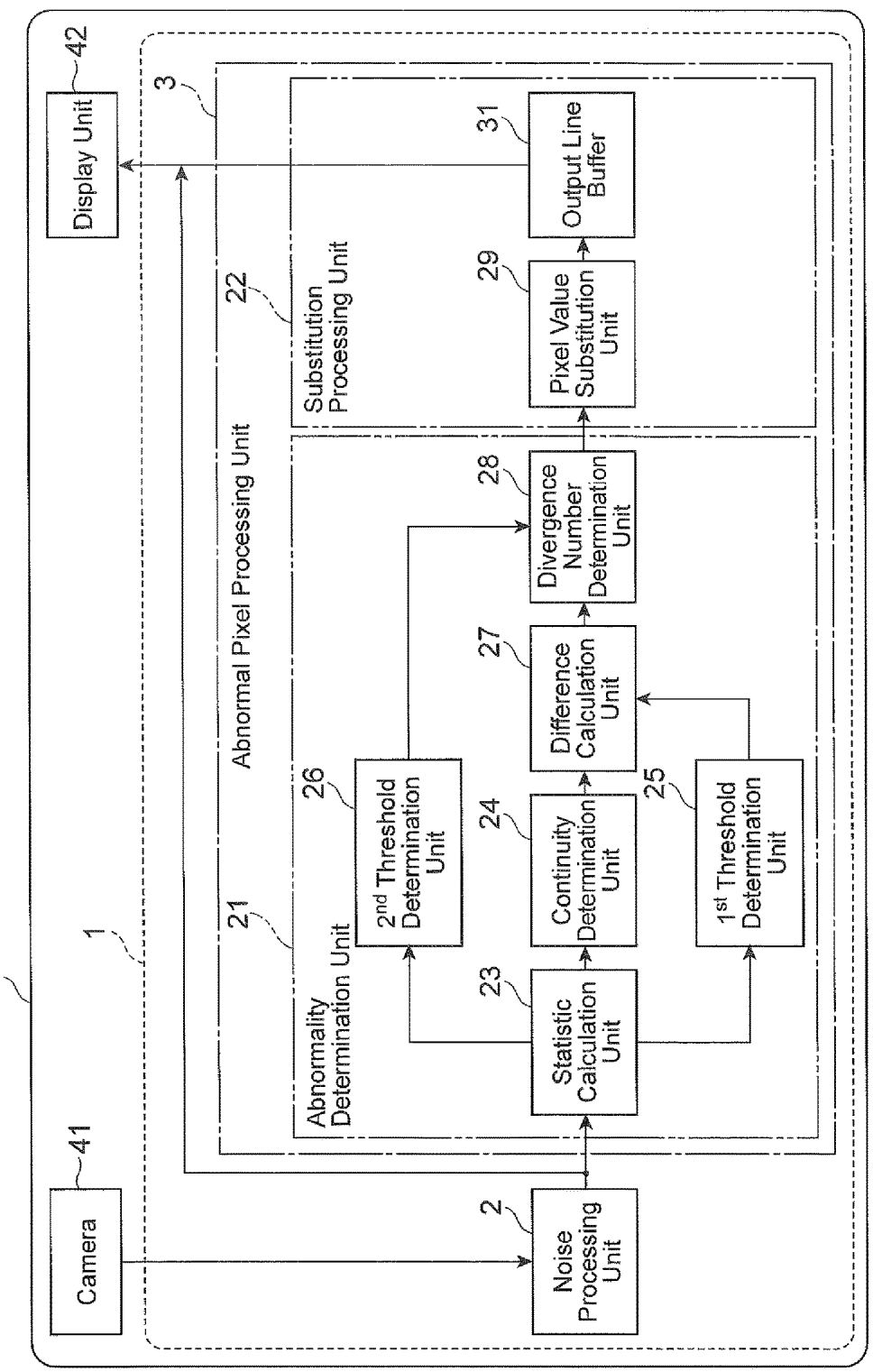
FIG. 4 is a functional block diagram of an abnormal pixel processing unit provided in the image processing device in accordance with the embodiment.

The abnormal pixel processing unit 3 removes abnormal pixels which may be included in the processed image outputted from the noise processing unit 2. As illustrated in FIG. 4, the abnormal pixel processing unit 3 has an abnormality determination unit 21 and a substitution processing unit 22.

The abnormality determination unit 21 determines whether or not the corrected pixel value stored in the posterior line buffer 19 is abnormal. More specifically, for each of a plurality of corrected pixel values stored in the posterior buffer, the abnormality determination unit 21 determines whether or not the corrected pixel value is abnormal by comparing a target pixel value (second target pixel value) of an abnormality processing target pixel with an estimated pixel value of the abnormality processing target pixel estimated from surrounding pixel values of surrounding pixels in the surroundings of the abnormality processing target pixel. The abnormality determination unit 21 has a statistic calculation unit 23, a continuity determination unit 24, a first threshold determination unit 25, a difference calculation unit 27, a second threshold determination unit 26, and a divergence number determination unit 28.

The statistic calculation unit 23 calculates a statistic utilized for the abnormality detetmination. By selecting the abnormality processing target pixel from the corrected pixels stored in the posterior line buffer 19, the statistic calculation unit 23 acquires the target pixel value of the abnormality processing target pixel. More specifically, the statistic calculation unit 23 extracts a predetermined area (e.g., 5 pixels×5 pixels) in the surroundings of the abnormality processing target pixel as one block.

The continuity determination unit 24 determines whether or not the image constructed by the blocks extracted by the statistic calculation unit 23 is continuous. The continuity determination unit 24 first calculates an absolute value of the difference between the average pixel value and the center pixel value within the block. Next, the continuity determination unit 24 compares the absolute value to a predetermined threshold value. If the absolute value is lower than the predetermined threshold value, the continuity determination unit 24 determines that the center pixel is not an abnormal pixel, and skips the process in the next stage. If the absolute value is higher than the predetermined threshold value, the continuity determination unit 24 determines that the center pixel is an abnormal pixel, and implements the process in the next stage. Therefore, the continuity determination unit 24 is provided for making the abnormal pixel processing more efficient.

The first threshold determination unit 25 determines a first threshold utilized for processing in the difference calculation unit 13. The first threshold determination unit 25 determines the first threshold by using a variance outputted from the statistic calculation unit 23. This variance indicates the variation among the pixel values included in the block extracted by the statistic calculation unit 23. Therefore, in the determination of the first threshold using the variance, the first threshold changes dynamically according to the variance.

The difference calculation unit 27 calculates differences (square errors) between the target pixel value and surrounding pixel values and acquires the number by which the differences exceeded the first threshold. Then, the difference calculation unit 27 outputs the number by which the differences exceeded the first threshold as divergence number.

The second threshold determination unit 26 determines a second threshold utilized for processing in the divergence number determination unit 28. The second threshold determination unit 26 determines the second threshold according to whether or not the image within the block extracted by the statistic calculation unit 23 includes any edge. The second threshold determination unit 26 outputs the second threshold to the divergence number determination unit 28.

The divergence number determination unit 28 determines whether or not the target pixel value of the abnormality processing target pixel is abnormal by comparing the convergence number outputted from the difference calculation unit 13 with the second threshold outputted from the second threshold determination unit 26.

When the target pixel value of the abnormality processing target pixel is determined to be abnormal, a pixel value substitution unit 29 substitutes the target pixel value stored in the abnormality processing pixel with the corrected pixel value obtained by using the estimated pixel value. Then, the pixel value substitution unit 29 outputs the substituted corrected pixel value to an output line buffer 31.

The output line buffer 31 stores according to Bayer pattern format, the corrected pixel value after the abnormal pixel processing or the pixel value stored in the posterior line buffer 19. That is, the outline buffer 31 has a data storage area equivalent to that of the input line buffer 4 and posterior line buffer 19. For the pixel determined abnormal by the abnormality determination unit 21, the corrected pixel value calculated by the substitution processing unit 22 is stored in place of the target pixel value. For the pixel not determined abnormal by the abnormality determination unit 21, the target pixel value is stored.

The corrected pixel value stored in the output line buffer 31 is targeted to predetermined data processing such as full colorization and then is displayed in the display unit 42.

Figure 5:
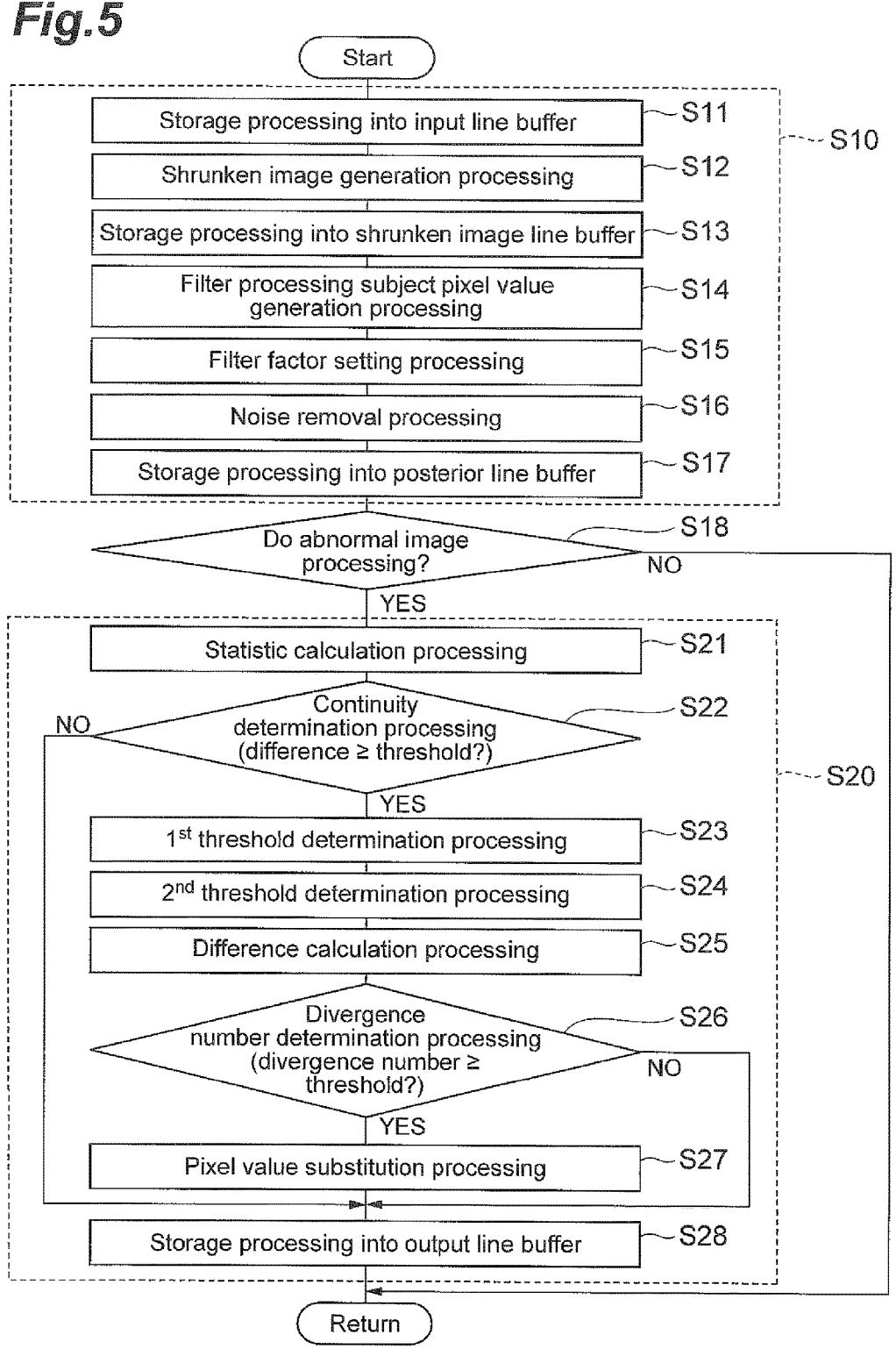
FIG. 5 is a flowchart for explaining operations of the image processing device in accordance with the embodiment.
Figure 6:
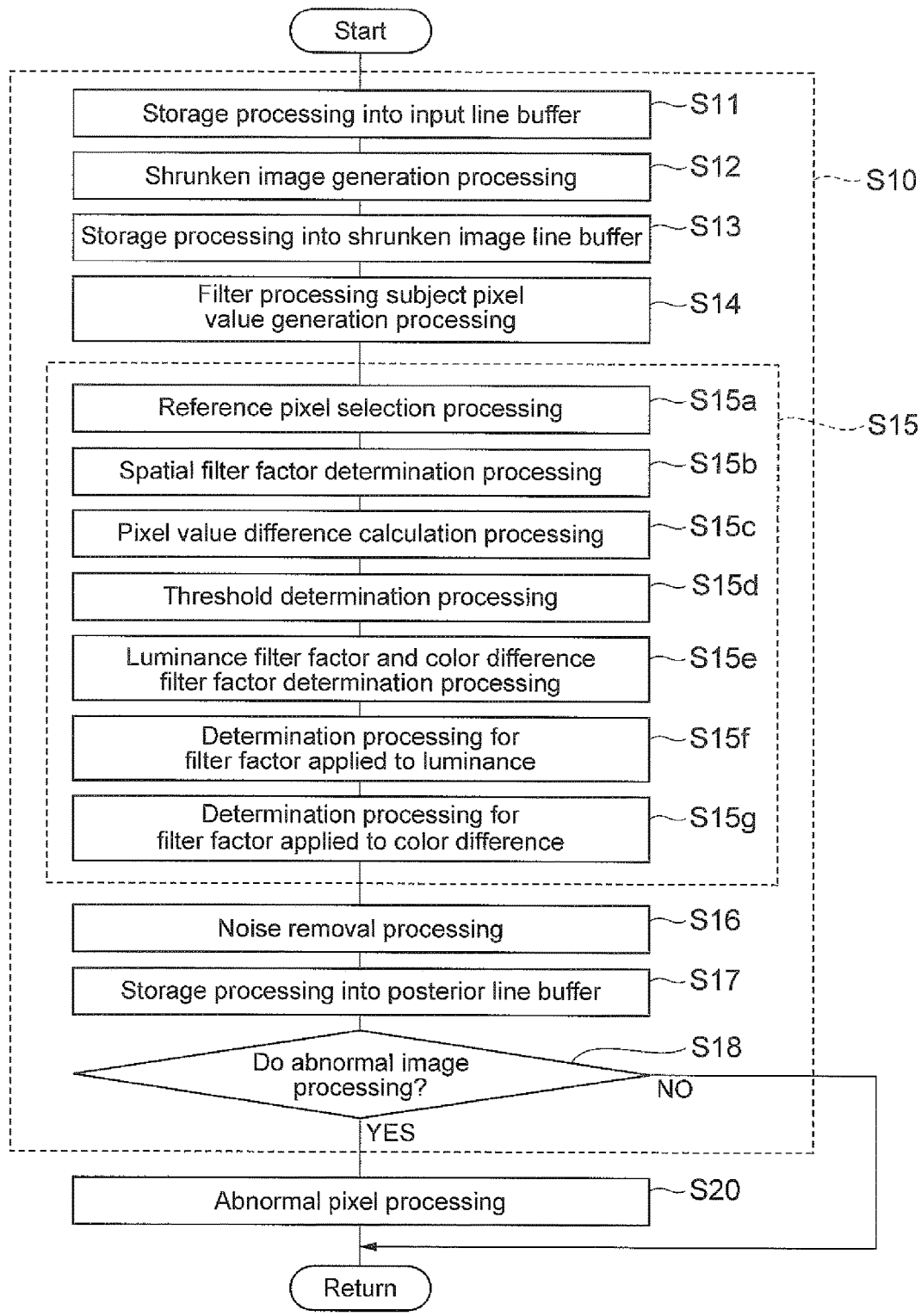
FIG. 6 is a detailed flowchart for explaining operations of the image processing device in accordance with the embodiment.

Operations of the image processing device 1 in accordance with this embodiment will be explained. FIGS. 5 and 6 are flowcharts illustrating operations of the image processing device 1 in accordance with this embodiment. For example, the control processing illustrated in FIGS. 5 and 6 is started at a timing at which the imaging function of the portable terminal T is turned ON and repeated at a predetermined cycle.

As illustrated in FIG. 5, noise processing S10 is executed. In the noise processing S10, storing processing S11 in the input buffer is performed, so as to read pixel values sequentially from the light-receiving elements of the camera 41, and the read pixel values are stored in the input line buffer 4.

The shrunken image generation unit 8 of the filter setting unit 6 executes shrunken image generation processing S12. In the generation processing S12, the shrunken image generation unit 8 extracts a block of 4 pixels×4 pixels in the input line buffer 4 as one shrunken pixel. Then, the shrunken image generation unit 8 performs averaging processing by using each of the respective pixel values of the R, G, and B components included in the block. This averaging processing shrinks and fully colorizes the pixel values stored in the input line buffer 4. The generation processing S12 then outputs the R, G, and B components ($R_{ref}$, $G_{ref}$, $B_{ref}$) obtained by the averaging processing as pixel values of the shrunken pixel.

The shrunken image line buffer 9 of the filter setting unit 6 executes storage processing S13 in the shrunken image line buffer 9. The image processing device 1 repeatedly performs a step of executing the generation processing S12 and storage processing S13 in sequence.

The target pixel value generation unit 12 of the filter setting unit 6 executes generation processing S14 for the target pixel value. By the generation processing S14, the target pixel value ($R_{org}$, $G_{org}$, $B_{org}$) (first target pixel value) is obtained. The generation processing S14 selects a noise processing target pixel to be targeted to noise processing in the input line buffer 4. The generation processing S14 selects a plurality of pixels existing in the surroundings of the noise processing target pixel as pixels for sampling. For example, the generation processing S14 extracts a block of 5 pixels×5 pixels centering the noise processing target pixel. The generation processing S14 shrinks and fully colorizes the image by using the pixel values of the pixels constituting the block. The generation processing S14 targets the pixel values of the sampling pixels to average processing, so as to obtain pixel values of the other color components not of the noise processing target pixel.

Figure 7:
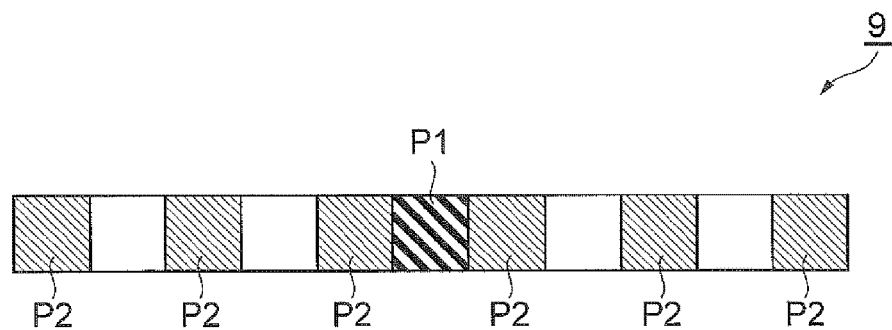
FIG. 7 is an explanatory view of processing for selecting reference pixels.

The reference pixel selection unit 11 executes filter factor setting processing (filter setting step) S15. As illustrated in FIG. 6, the setting processing S15 executes reference pixel selection processing S15a. The selection processing S15a selects one or a plurality of pixels from pixels of the shrunken image stored in the shrunken image line buffer 9. The selection processing S15a does not sequentially select all the pixels of the shrunken image. The selection processing S15a selects pixels at positions which have already been set according to the size of the shrunken image line buffer 9 with respect to the center pixel corresponding to the noise processing target pixel. For example, as illustrated in FIG. 7, the selection processing S15a selects surrounding pixels P2 for a center pixel P1 as reference pixel. In the case where one pixel is selected in the selection processing S15a (one pixel sampling), the pixel value of the selected pixel and the distance from the center pixel to the selected pixel are outputted. This distance may satisfy any definition of the distance, including Manhattan distance, Euclidean distance and the like. In the case where a plurality of pixels are selected in the selection processing S15a (average sampling within the area), a value averaging the respective pixel values in the plurality of pixels is outputted as a reference pixel value ($R_{ref}$, $G_{ref}$, $B_{ref}$). In the case where the plurality of pixels are selected in the selection processing S15a (average sampling within the area), the distance obtained by averaging the respective distances from the center pixel to the plurality of pixels is outputted.

The spatial filter factor determination unit 16a executes spatial filter factor determination processing S15b. The determination processing S15b determines a spatial filter factor ($\omega_{SP}$) by using the distance from the center pixel to the reference pixel acquired by the reference pixel selection processing S15a. When the spatial filter factor ($\omega_{SP}$) is defined as a function in which the distance is a variable in the determination processing S15b, the distance is inputted to the function, so as to calculate the spatial filter factor ($\omega_{SP}$). The determination processing S15b utilizes a preset value as the spatial filter factor ($\omega_{SP}$) of the center pixel.

The difference calculation unit 13 executes pixel value difference (diff) calculation processing S15c. The calculation processing S15c utilizes the target pixel value ($R_{org}$, $G_{org}$, $B_{org}$) and the reference pixel value ($R_{ref}$, $G_{ref}$, $B_{ref}$) of the reference pixel as represented by expression (1). More specifically, the calculation processing S15c calculates the target pixel value ($R_{org}$, $G_{org}$, $B_{org}$) and reference pixel value ($R_{ref}$, $G_{ref}$, $B_{ref}$) as a difference ($\text{diff}_{luma}$) of the luminance component (Y) and a difference ($\text{diff}_{chroma}$) of the chroma component (UV), respectively. The calculation processing S15c calculates the pixel value difference (diff) between the target pixel value ($R_{org}$, $G_{org}$, $B_{org}$) and reference pixel value ($R_{ref}$, $G_{ref}$, $B_{ref}$) by using the difference ($\text{diff}_{luma}$) of the luminance component (Y) and the difference ($\text{diff}_{chroma}$) of the chroma component (UV).

[Math. 1]

$$\text{diff} = f_1(\text{diff}_{luma}, \text{diff}_{chroma})$$

$$\text{diff}_{luma} = f_2[(R_{org}-R_{ref}), (G_{org}-G_{ref}), (B_{org}-B_{ref})]$$

$$\text{diff}_{chroma} = f_3[(R_{org}-R_{ref}), (G_{org}-G_{ref}), (B_{org}-B_{ref})] \quad (1)$$

where
diff: difference;
$\text{diff}_{luma}$: difference of the luminance component;
$\text{diff}_{chroma}$: difference of the chroma component;
$R_{org}$: R component of the target pixel value;
$G_{org}$: G component of the target pixel value;
$B_{org}$: B component of the target pixel value;
$R_{ref}$: R component of the reference pixel value;
$G_{ref}$: G component of the reference pixel value;
$B_{ref}$: B component of the reference pixel value;
f1, f2, f3: functions.

The threshold determination unit 14 executes threshold value determination processing S15d. The determination processing S15d determines one or a plurality of thresholds ($\text{diff}_{thre}$) for defining a luminance filter factor ($\omega_Y$) and a chroma filter factor ($\omega_{UV}$). The determination processing S15d determines the threshold ($\text{diff}_{thre}$) by using the pixel value of the noise processing target pixel. More specifically, by using the luminance component (Y) of the noise processing target pixel represented according to YUV format as the pixel value, the determination processing S15d applies the luminance component (Y) to expression (2), so as to calculate the threshold ($\text{diff}_{thre}$). That is, the threshold ($\text{diff}_{thre}$) dynamically changes according to the luminance component (Y). The determination processing S15d may set the difference (diff) larger or smaller as the luminance component (Y) is larger (brighter) or smaller (darker), respectively. The determination processing S15d calculates the threshold ($\text{diff}_{thre}$) by using a function in which the luminance component (Y) is a variable as represented by the expression (2). By appropriately selecting the type and coefficients of the function, it is possible to control the luminance component (Y) and threshold ($\text{diff}_{thre}$) such that they have a desirable relationship therebetween, thereby to regulate the degree of filter processing for removing noise.

[Math. 2]

$$\text{diff}_{thre(i,j)} = f_4(Y_{org})_{(i=n, j=Y, UV)} \quad (2)$$

where
$\text{diff}_{thre(i,j)}$: threshold;
$Y_{org}$: luminance component of the noise processing target pixel;
$f_4$: function.

For example, the determination processing 15d determines a threshold ($\text{diff}_{thre}$(i=n, j=Y)) as a threshold for the luminance component (Y). The determination processing 15d determines a threshold ($\text{diff}_{thre}$(i=n, j=UV)) as a threshold for the chroma component (UV). Here, n is an integer of 1 or greater. n is meant to be the number classifying the difference (diff) of the luminance component (Y) according to its magnitude. The determination processing S15d utilizes preset values as the luminance filter factor ($\omega_Y$) and chroma filter factor ($\omega_{UV}$) of the center pixel.

Here, the case using the luminance component (Y) alone for calculating the threshold (diff$_{thre}$) in the determination processing S15d is explained as an example, the determination processing S15d may utilize the chroma component (UV) for calculating the threshold (diff$_{thre}$). The above-mentioned expression (2) may include the chroma component (UV) in addition to or in place of the luminance component (Y).

The luminance filter factor determination unit 16b and chroma filter determination unit 16c execute determination processing S15e for the luminance filter factor ($\omega_Y$) and chroma filter factor ($\omega_{UV}$). The determination processing S15e compares the pixel value difference (diff) obtained by the pixel value difference calculation processing S15c with the threshold (diff$_{thre}$) obtained by the threshold determination processing S15d, so as to determine values of the luminance filter factor ($\omega_Y$) and chroma filter factor ($\omega_{UV}$).

The determination processing S15e determines a first value as the luminance filter factor ($\omega_Y$) when the pixel value difference (diff) is greater than the threshold (diff$_{thre}$(i=0, j=Y)), for example. On the other hand, the determination processing S15e determines a second value as the luminance filter factor ($\omega_Y$) when the pixel value difference (diff) is not greater than the threshold (diff$_{thre}$(i=1, j=Y)). The first value is greater than the second value. The determination processing S15e determines a third value as the chroma filter factor ($\omega_{UV}$) when the pixel value difference (diff) is greater than the threshold (diff$_{thre}$(i=0, j=UV)). On the other hand, the determination processing S15e determines a fourth value as the chroma filter factor ($\omega_{UV}$) when the pixel value difference (diff) is not greater than the threshold (diff$_{thre}$(i=1, j=UV)), for example. The third value is greater than the fourth value.

The filter factor determination unit 17a executes determination processing S15f for the filter component applied to luminance. The filter component applied to luminance is a weight by which the luminance component (Y) of the reference pixel value is multiplied in noise removal processing in a later stage. The filter factor ($\omega_{SP} \times \omega_Y$) applied to luminance is the spatial filter factor ($\omega_{SP}$) multiplied by the luminance filter factor ($\omega_Y$).

The filter factor determination unit 17b executes determination processing S15g for the filter component applied to the chroma component. The filter component applied to the chroma component is a weight by which the chroma component (UV) of the reference pixel value is multiplied in the noise removal processing in a later stage. The filter factor ($\omega_{SP} \times \omega_{UV}$) applied to the chroma component is the spatial filter factor ($\omega_{SP}$) multiplied by the chroma filter factor ($\omega_{UV}$).

As represented by the expression (2), the threshold (diff$_{thre}$) changes dynamically according to the luminance component (Y) constituting the first target pixel value. Therefore, the relationship between the pixel value difference (diff) and luminance filter factor ($\omega_Y$) changes dynamically according to the luminance component (Y) constituting the first target pixel value. Consequently, the relationship between the pixel value difference (diff) and the filter factor applied to luminance changes dynamically according to the luminance component (Y) constituting the first target pixel value. Similarly, the relationship between the pixel value difference (diff) and chroma filter factor ($\omega_{UV}$) changes dynamically according to the luminance component (Y) constituting the first target pixel value. Therefore, the relationship between the pixel value difference (diff) and the filter factor applied to the chroma component changes dynamically according to the luminance component (Y) constituting the first target pixel value.

The corrected pixel value calculation unit 18 executes noise removal processing (noise removal step) S16. By using the pixel value (YUV) obtained by the reference pixel selection processing S15a, the filter factor ($\omega_{SP} \times \omega_Y$) applied to luminance, and the filter factor ($\omega_{SP} \times \omega_{UV}$) applied to the chroma component, the noise removal processing S16 performs weighted averaging processing represented by expression (3). The noise removal processing S16 treats the reference pixel value as the luminance component (Y) and chroma component (UV). After the above-mentioned reference pixel selection processing S15a, noise removal processing is executed for each of the reference pixels preordained to be selected. Then, by the noise removal processing S16, the noise-processed corrected pixel value is obtained.

[Math. 3]

$$\overline{Y}_{ref} = \frac{\Sigma(Y_{ref} \times \omega_{sp} \times \omega_Y)}{\Sigma(\omega_{sp} \times \omega_Y)}$$
$$\overline{U}_{ref} = \frac{\Sigma(U_{ref} \times \omega_{sp} \times \omega_{UV})}{\Sigma(\omega_{sp} \times \omega_{UV})}$$
$$\overline{V}_{ref} = \frac{\Sigma(V_{ref} \times \omega_{sp} \times \omega_{UV})}{\Sigma(\omega_{sp} \times \omega_{UV})}$$
(3)

$\overline{Y}_{ref}$: weighted average value of the luminance component;
$\overline{U}_{ref}$: weighted average value of the chroma component;
$\overline{V}_{ref}$: weighted average value of the chroma component;
$Y_{ref}$: luminance component of the reference pixel;
$U_{ref}$: chroma component of the reference pixel;
$V_{ref}$: chroma component of the reference pixel;
$\omega_{sp}$: spatial filter factor;
$\omega_Y$: luminance filter factor;
$\omega_{UV}$: chroma filter factor.

In FIG. 6, the determination processing S15f for the filter factor applied to luminance is executed before the determination processing S15g for the filter factor applied to the chroma component. However, the determination processing S15g may be performed before the determination processing S15f. The determination processing S15f and determination processing S15g may be executed in parallel at the same time.

With the posterior line buffer 19, storage processing S17 is executed. By using the corrected pixel value (YUV) obtained by the noise removal processing S16, the storage processing S17 stores the corrected pixel value in the posterior buffer 19 at a position corresponding to the pixel selected as the noise processing target pixel by the noise processing target pixel generation processing S14. The storage processing S17 converts the corrected pixel value (YUV) to a corrected pixel value (RGB). When the pixel value of the noise processing target pixel is the R component, the storage processing S17 extracts the R component of the corrected pixel value (RGB) and stores the R component in the posterior line buffer 19. When the pixel value of the noise processing target pixel is the G component, the storage processing S17 extracts the G component of the corrected pixel value (RGB) and stores the G component in the posterior line buffer 19. When the pixel value of the noise processing target pixel is the B component, the storage processing S17 extracts the B component of the corrected pixel value (RGB) and stores the B component in the posterior line buffer 19.

The image processing device 1 executes operations from the target pixel value generation processing S14 to the storage processing S17 in the posterior line buffer 19 in the above-mentioned noise processing S10 for all the pixels stored in the input line buffer 4.

After executing the noise processing S10 for all the pixels, the image processing device 1 carries out step S18 for determining whether or not abnormal pixel processing is to be performed. When it is determined in step S18 that abnormal pixel processing S20 is to be performed (S18: YES), its subsequent abnormal pixel processing S20 is executed. When it is determined in step S18 that the abnormal pixel processing S20 is not to be performed (S18: NO), the subsequent abnormal pixel processing S20 is skipped.

As illustrated in FIG. 5, after the noise processing S10 is completed, the abnormal pixel processing S20 is executed. First, the statistic calculation unit 23 executes statistic calculation processing S21. The calculation processing S21 selects an abnormality processing target pixel from the posterior line buffer 19 as a pixel targeted to abnormality processing. The calculation processing S21 extracts an area of several pixels in the surroundings of the abnormality processing target pixel as one block. Subsequently, the calculation processing S21 extracts pixels having the same color components as those of the abnormality processing target pixel from a plurality of pixels constituting the block. Then, the calculation processing S21 calculates statistics such as the maximum value, minimum value, simple average value, and variance ($\sigma^2$) for the pixel values (e.g., G components) of the extracted pixels.

The continuity determination unit 24 executes continuity determination processing S22. The determination processing S22 calculates the difference between the average value of the pixel values outputted from the statistic calculation unit 23 and the target pixel value (second target pixel value). When the difference is smaller than a preset threshold, the determination step S22 determines that the target pixel value of the abnormality processing target pixel is not abnormal, so that its subsequent processing (S23 to S27) is skipped, whereby storage processing S28 in the output line buffer is executed. When the difference is larger than the preset threshold, the determination step S22 determines that the target pixel value of the abnormality processing target pixel is likely to be abnormal, whereby first threshold determination processing S23 is executed.

The first threshold determination unit 25 executes the first threshold determination processing S23. By using the variance ($\sigma^2$) of the pixel value obtained by the statistic calculation processing S21, the determination processing S23 determines a first threshold (square_diff$_{thre}$) utilized in difference calculation processing S25 in a later stage. The pixel values utilized in the determination processing S23 are the variance ($\sigma^2$) of the luminance component (Y) and the variance ($\sigma^2$) of the chroma component (UV). The determination processing S23 determines the first threshold by applying these variances ($\sigma^2$) to expression (4). The expression (4) is set such that the first threshold (square_diff$_{thre}$) increases as the variance ($\sigma^2$) is greater. According to the expression (4), the first threshold (square_diff$_{thre}$) is determined by the respective values for the luminance component (Y) and chroma component (UV).

[Math. 4]

$$\text{square\_diff}_{thre(j)} = f_5(\sigma^2)_{(j=Y,UV)} \qquad (4)$$

The second threshold determination unit 26 executes second threshold determination processing S24. The determination processing S24 determines a second threshold utilized in divergence number determination step S26 in a later stage. The determination processing S24 determines the second threshold such that it corresponds to the number of estimated pixel values calculated in the difference calculation processing S25 (it will be explained later). The determination processing S24 changes the second threshold dynamically according to whether or not the image within the block includes an edge. More specifically, the determination processing S24 sets the second threshold higher when the image within the block extracted by the statistic calculation unit 23 includes an edge than when not.

The determination processing S24 may be executed before the continuity determination processing S22 after the statistic calculation processing S21. The determination processing S24 may be executed in parallel with the continuity determination processing S22.

The difference calculation unit 13 executes the difference calculation processing S25. By using pixels existing on a line segment linking an abnormality processing target pixel to pixels existing on the periphery of the abnormality processing target pixel the difference calculation processing S25 calculates an estimated pixel value at the position of the abnormality processing target pixel. The calculation processing S25 calculates the difference between the target pixel value in the abnormality processing target pixel and the estimated pixel value. The calculation processing S25 compares the difference with the first threshold outputted from the first threshold determination unit 25. The calculation processing S25 performs calculation of the estimated pixel value, calculation of the difference between the target pixel value and estimated pixel value, and comparison of the difference and first threshold at a plurality of times in a predetermined direction toward the abnormality processing target pixel. The comparison of the difference and threshold is performed by the number of estimated pixel values. The calculation processing S25 counts the number by which the differences exceeded the first threshold as divergence number and outputs the divergence number to the divergence number determination unit 28.

The divergence number determination unit 28 executes divergence number determination processing S26. The determination processing S26 compares the divergence number obtained by the difference calculation processing S25 with the second threshold obtained by the second threshold determination processing S24. When the divergence number is equal to the second threshold or greater, the determination processing S26 determines that the target pixel value of the abnormality processing target pixel is abnormal, whereby pixel value substitution processing S27 is performed. When the divergence number is less than the second threshold, the determination processing S26 determines that the target pixel value of the abnormality processing target pixel is normal, so that the pixel value substitution step S27 is skipped, whereby the storage processing S28 with respect to the output line buffer 31 is executed.

The pixel value substitution unit 29 executes the pixel value substitution processing S27. The substitution processing S27 substitutes the target pixel value stored in the abnormality processing target pixel with a corrected pixel value obtained by using the estimated pixel value. The corrected pixel value is calculated by using a plurality of estimated pixel values calculated by the difference calculation unit 13. Examples of the corrected pixel value include a simple average value of a plurality of estimated pixel values and a simple average value of values of a plurality of estimated pixel values excluding their maximum and minimum values.

With the output line buffer 31, the storage processing S28 is executed. The state leading to the storage processing S28 may be any of three states of the first state shifted from the continuity determination processing S22, the second state shifted from the convergence number determination processing S26, and the third state shifted from the pixel value substitution processing S27. When the state leading to the storage processing S28 is the first or the second state, it is a result from the determination that the target pixel value of the abnormality processing target pixel is normal. Therefore, the storage processing S28 stores the target pixel value as it is in the output line buffer 31. When the state leading to the storage processing S28 is the third state, it is a result from the determination that the target pixel value of the abnormality processing target pixel is abnormal. Therefore, the storage processing S28 stores the corrected pixel value in the output line buffer 31. In other words, the storage processing S28 in the third state substitutes the pixel value stored at a predetermined position of the posterior line buffer 19 with the corrected pixel value, whereby the corrected pixel value is stored in the output line buffer 31 at a position corresponding to the predetermined position in the posterior line buffer 19.

Thereby, the image processing device 1 completes the control processing illustrated in FIGS. 5 and 6. The control processing illustrated in FIGS. 5 and 6 executes processing for removing noise in the state of Bayer pattern format and processing for removing the abnormal pixel value, whereby the noise superposed on the image to be filtered can be removed favorably. That is, signals targeted to noise processing in the above-mentioned image processing method are Bayer signals. Therefore, correlations among different pixels are so low that noise can be removed effectively. It is hence unnecessary for the noise processing S10 to detect any edge, whereby image quality can be improved while eliminating edge detection processing.

An image processing program for enabling the portable terminal (computer) T to function as the above-mentioned image processing device 1 will be explained.

The image processing program comprises a main module, an input module, and an arithmetic processing module. The main module is a part which integrally controls image processing. The input module operates the portable terminal T so as to acquire frame images. The arithmetic processing module has the noise processing unit 2 and abnormal pixel processing unit 3. Functions achieved by executing the main module, input module, and arithmetic processing module are the same as the functions of the noise processing unit 2 and abnormal pixel processing unit 3 in the above-mentioned image processing device 1.

The image processing program is provided by a recording medium such as a ROM or a semiconductor memory, for example. The image processing program may also be provided as data signals through a network.

As in the foregoing, the image processing device 1, image processing method, and image processing program in accordance with this embodiment execute filter processing for removing noise for pixel values arranged according to Bayer pattern format. In the pixel values arranged according to Bayer pattern format, spatial correlations among different pixels are so low that abnormal pixel values do not affect their surrounding pixel values. Therefore, excellent noise removal effects can be exhibited.

More specifically, the image processing device 1, image processing method, and image processing program in accordance with this embodiment differ from the technique disclosed in Patent Literature 1 in terms of approach in that the present invention separates Bayer signals into luminance components (Y) and chroma components (UV) and calculate weighting factors for the luminance components (Y) and chroma components (UV) according to the differences. The image processing device 1, image processing method, and image processing program in accordance with this embodiment can set weighting factors for the luminance components (Y) and chroma components (UV) to values different from each other. The technique disclosed in Patent Literature 1 has such a narrow surrounding reference area that it is limited in terms of low frequency noise removal performance, whereas the image processing device 1, image processing method, and image processing program in accordance with this embodiment can substantially refer to pixels in a wide area by using a shrunken image as reference pixels while suppressing the number of required line buffers, thereby enabling noise removal with higher accuracy.

By substituting abnormal pixel values with estimated pixel values, the image processing device 1, image processing method, and image processing program in accordance with this embodiment can eliminate abnormal pixels in the image to be filtered. Therefore, further excellent noise removal effects can be exhibited.

The above-mentioned embodiment illustrates an example of the image processing device in accordance with the present invention. The image processing device in accordance with the present invention is not limited to the image processing device 1 in accordance with the embodiment, but may be any of modifications of the image processing device in accordance with the embodiment or applications thereof to others within the scope not departing from the gist of each claim.

For example, the image processing device may comprise the noise processing unit 2 alone without the abnormal pixel processing unit 3. The image processing device may be constructed such that the abnormal pixel processing unit 3 is placed prior to the noise processing unit 2. That is, the abnormal pixel processing S20 is executable for images storing pixel values according to Bayer pattern format and thus may be performed before the noise processing S10.

For instance, as an example of dynamically changing the relationship between the pixel value difference and the first and second filter factors according to the first target pixel value, the above-mentioned embodiment explains a case using a threshold corresponding to luminance (first target pixel value). Other examples include those using functions which monotonously decrease (e.g., normal distribution functions) or monotonously increase according to the pixel value difference as with the spatial filter. Specifically, variance parameters of normal distributions may be changed dynamically according to the target pixel value.

For example, the input line buffer 4, shrunken image line buffer 9, posterior line buffer 19, and output line buffer 31 may be set to desirable sizes.

For example, the shrunken image generation processing S12 and noise processing pixel value generation processing S14 may select blocks having desirable numbers of pixels.

For example, the Bayer pattern, which is an additive color (RGB) filter in this embodiment, may also be any of other color filters such as a subtractive color (CMYK) filter. The form and arrangement of each sensor is not limited to a rectangular grid, but may be a honeycomb structure of a hexagonal sensor or the like.

What is claimed is:

1. An image processing device for performing noise removal processing for an input image comprising image pixels, the image processing device comprising:
   a buffer configured to store pixel values of the image pixels according to Bayer pattern format, wherein one or more of the image pixels are selectable as an abnormality processing target pixel having a target pixel value;
   a processor; and
   a memory device storing executable instructions that, when executed by the processor, cause the processor to:
   calculate each of a plurality of estimated pixel values for the abnormality processing target pixel based, at least in part, on one or more of the image pixels that are linearly arranged with the abnormality processing target pixel;
   perform a plurality of comparisons of the target pixel value of the abnormality processing target pixel with the plurality of estimated pixel values to determine, based on the plurality of comparisons, whether or not the target pixel value is abnormal; and
   substitute the target pixel value with one of the plurality of the estimated pixel values when the target pixel value is determined to be abnormal based on the plurality of comparisons.

2. The image processing device according to claim 1, wherein the plurality of comparisons are performed by:
   comparing the target pixel value of the abnormality processing target pixel with the plurality of estimated pixel values, to determine a divergence number representing a number of comparison results indicating that the target pixel value is divergent relative to a respective one of the plurality of estimated pixel values; and
   determining whether or not the target pixel value is abnormal based on the divergence number.

3. The image processing device according to claim 2, wherein the executable instructions stored in the memory device further cause the processor to:
   extract an area of the image pixels including the abnormality processing target pixel;
   calculate a variance in pixels values, associated with the area extracted; and
   set a first threshold based at least in part on the variance, wherein the divergence number is obtained by calculating a difference between the target pixel value of the abnormality processing target pixel and each of the plurality of estimated pixel values to obtain respective differences, and setting the divergence number to a number of the differences exceeding the first threshold.

4. The image processing device according to claim 2, wherein the executable instructions stored in the memory device further cause the processor to:
   extract an area of the image pixels including the abnormality processing target pixel; and
   set a second threshold based on a determination as to whether the area includes an edge of the input image, wherein the divergence number is compared to the second threshold to determine whether or not the target pixel value is abnormal.

5. The image processing device according to claim 4, wherein the second threshold is set higher when the area includes the edge.

6. The image processing device according to claim 4, wherein the second threshold is greater than one.

7. The image processing device according to claim 1 wherein, for each of the plurality of estimated pixel values that are calculated for the abnormality processing target pixel, the one or more image pixels are linearly arranged in a predetermined direction.

* * * * *